L. F. JOHNSTON.
Wedges for Splitting Logs.

No. 212,230. Patented Feb. 11, 1879.

WITNESSES:
Gustave Dieterich
J. H. Scarborough

INVENTOR:
L. F. Johnston.
BY Munn & Co
ATTORNEYS.

UNITED STATES PATENT OFFICE.

LARKIN F. JOHNSTON, OF POCAHONTAS, ARKANSAS.

IMPROVEMENT IN WEDGES FOR SPLITTING LOGS.

Specification forming part of Letters Patent No. 212,230, dated February 11, 1879; application filed September 10, 1878.

*To all whom it may concern:*

Figure 1:
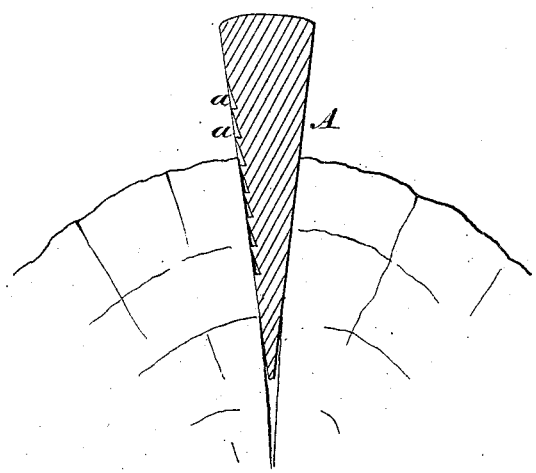
Figure 4:
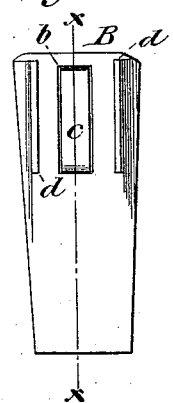
Figure 2:
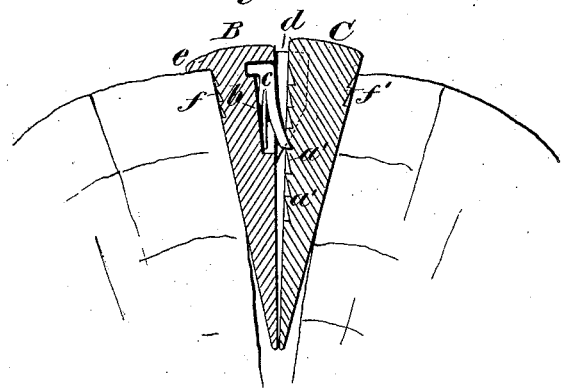
Figure 5:
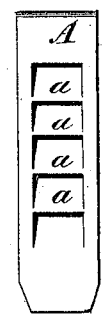
Figure 3:
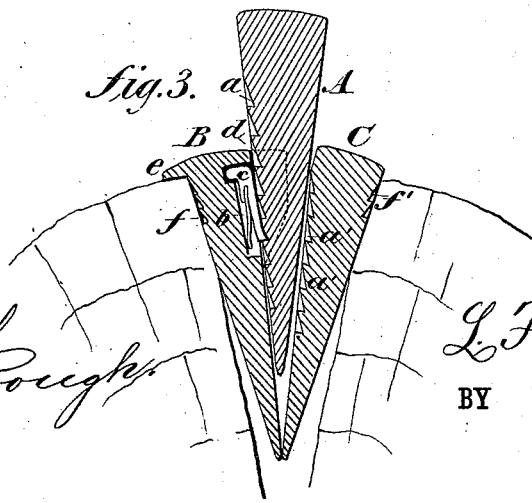

Be it known that I, LARKIN F. JOHNSTON, of Pocahontas, county of Randolph, and State of Arkansas, have invented a new and Improved Wedge, of which the following is a specification:

Figure 1 is a longitudinal section of a portion of my improved wedge. Figs. 2 and 3 represent parts of the wedge in different positions. Fig. 4 is a side elevation of the wedge containing the pawl. Fig. 5 is detail view of one of the wedges, showing ratchet-teeth.

Similar letters of reference indicate corresponding parts.

The object of my invention is to provide a wedge which will be more effective in splitting logs than wedges of ordinary form, and which will entirely obviate bouncing or the slipping out of the wedge.

In the drawings, A is a wedge, having formed in one of its sides a number of ratchet-teeth, $a$, which are arranged in the center of the wedge, leaving the edges smooth and straight. This wedge is driven into the log, and the wedge B placed by its side.

The wedge B is provided with a recess, $b$, in which a spring-pawl, $c$, is placed, and with ears $d$ at its sides for receiving and guiding the wedge that is driven into the log against the face of it. It is also provided with the lip $e$, that prevents it from being driven too far into the log, and with ratchet-teeth $f$, for retaining it in position in the log.

C is a wedge, having ratchet-teeth $a'$, similar to those in the wedge A, and teeth $f'$ on the opposite side, like those on the wedge B.

The wedge C is driven into the log against the wedge B, and its ratchet-teeth $a'$ are engaged by the spring-pawl $c$ as it is driven in, so that it cannot bounce or fly out. When this wedge is driven in, its teeth $f'$ engage the wood of the log and prevent it from flying out. The wedge A becomes loosened when the wedge C is driven in, when it is removed and driven between the wedges B C, and is retained by the engagement of the pawl $c$ with its ratchet-teeth $a$.

By means of my improved compound wedge logs may be readily split, and the trouble and annoyance caused by the flying out of the wedge are entirely obviated.

Having thus described my invention, I claim as new and desire to secure by Letters Patent—

1. A wedge provided with a spring-pawl, in combination with one or more wedges having ratchet-teeth, substantially as herein shown and described.

2. The wedge B, having the pawl $c$, ears $d$, lip $e$, and teeth $f$, the wedge A, having ratchet-teeth $a$, and the wedge C, having ratchet-teeth $a'$ and teeth $f'$, in combination, substantially as shown and described.

LARKIN FARLEY JOHNSTON.

Witnesses:
HENRY A. SLAUGHTER,
JAMES M. DAVIDSON.